(12) United States Patent
Deco et al.

(10) Patent No.: US 6,363,333 B1
(45) Date of Patent: Mar. 26, 2002

(54) METHOD OF CLASSIFYING STATISTICAL DEPENDENCY OF A MEASURABLE SERIES OF STATISTICAL VALUES

(75) Inventors: Gustavo Deco; Christian Schittenkopf, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,392
(22) PCT Filed: Sep. 15, 1997
(86) PCT No.: PCT/DE97/02068
  § 371 Date: Apr. 30, 1999
  § 102(e) Date: Apr. 30, 1999
(87) PCT Pub. No.: WO98/19252
  PCT Pub. Date: May 7, 1998

(30) Foreign Application Priority Data
Oct. 30, 1996 (DE) .......................... 196 43 918

(51) Int. Cl.[7] .............................. G06F 15/00
(52) U.S. Cl. .......................... 702/191; 706/31
(58) Field of Search ................. 702/179, 189, 702/75, 76, 77, 191; 706/31; 73/41.4; 703/2; 700/121

(56) References Cited

U.S. PATENT DOCUMENTS

5,417,211 A * 5/1995 Abraham-Fuchs et al. ............. 128/653.1
5,822,742 A * 10/1998 Alkon et al. ................ 706/31
5,938,594 A * 8/1999 Poon et al. ................. 600/300

OTHER PUBLICATIONS

"Nonparametric Data Selection for Improvement of Parametric Neural Learning: A Cumulant–Surrogate Method," Deco et al., ICANN 96, Jul. 16, 1996, pp. 121–126.
"Learning Time Series Evolution by Unsupervised Extraction of Correlations," Deco et al., Physical Review E, Vol. 51, No. 3, Mar. 1995, pp. 1780–1790.
"Unsupervised Learning for Boltzmann Machines," Deco et al., Network: Computation in Neural Systems, vol. 6, No. 3, Aug. 1, 1995, pp. 437–448.
"Testing for Nonlinearity in Time Series: The Method of Surrogate Data," Theiler et al., Physica D, vol. 58 (1992), pp. 77–94.

* cited by examiner

*Primary Examiner*—Marc S. Hoff
*Assistant Examiner*—Dinh T. Hang
(74) *Attorney, Agent, or Firm*—Schiff Hardin & Waite

(57) ABSTRACT

A time series that is established by a measured signal of a dynamic system, for example a quotation curve on the stock market, is modelled according to its probability density in order to be able to make a prediction of future values. A non-linear Markov process of the order m is suited for describing the conditioned probability densities. A neural network is trained according to the probabilities of the Markov process using the maximum likelihood principle, which is a training rule for maximizing the product of probabilities. The neural network predicts a value in the future for a prescribable number of values m from the past of the signal to be predicted. A number of steps in the future can be predicted by iteration. The order m of the non-linear Markov process, which corresponds to the number of values from the past that are important in the modelling of the conditioned probability densities, serves as parameter for improving the probability of the prediction.

4 Claims, 2 Drawing Sheets

METHOD OF CLASSIFYING STATISTICAL DEPENDENCY OF A MEASURABLE SERIES OF STATISTICAL VALUES

BACKGROUND OF THE INVENTION

1. Field of the Invention

The invention is directed to a method for the classification of the statistical dependency of a measurable, first time series that comprises a prescribable plurality of samples, particularly of an electrical signal, with a computer.

2. Description of the Invention

The analysis of dynamic systems in view of a classification of the statistical dependency for the prediction of the curve or an arbitrary measured signal is a motivation for versatile applications.

A given measured signal x can be sampled with the step width w (see FIG. 1). This signal that seems arbitrary contains linear and non-linear statistical dependencies that are analyzed dependent on a specific plurality of values v in the past, and the acquired information is utilized to predict a plurality of values z in the future.

SUMMARY OR THE INVENTION

An object of the present invention is to provide a method in order to classify the information flow of an arbitrary measured signal according to a statistical dependency with a computer, taking real disturbing factors such as, for example, noise into consideration.

The invention presents a suitable method for the classification of the information flow of a dynamic system. The probability density of a measured signal is modelled by a neural network for this purpose. Predictions with respect to the curve of a signal composed of v past values can be made for z future values with this trained neural network. The extent to which these predictions are accurate within a range to be defined can be improved by raising the order, i.e. the plurality of steps v in the past. The precision of the prediction fluctuates within a variance (Gaussian distribution or sum of Gaussian distributions) lying around a mean value.

The prediction probability is modelled by probability densities of a dynamic system. The dynamic system can be established by an arbitrary measured signal. A non-linear Markov process of the order m proves suitable for describing conditioned probability densities. The non-linear Markov process is thus modelled by a neural network so that, dependent on the order m of the non-linear Markov process, a prediction for r steps into the future can be made with the assistance of the neural network. The order m of the non-linear Markov process thereby corresponds to the plurality of values from the past that are taken into consideration in the conditioned probability densities. The predicted value for a respective step r lies in the region around a statistical mean established by a variance.

The neural network can be trained in that the product of the probabilities is maximized according to the maximum likelihood principle. m+1 values of the dynamic system that is to be modelled are required as input for training the neural network, whereby m represents the order of the non-linear Markov process. The prediction probabilities corresponding to the non-linear Markov process are trained.

An arbitrary number of surrogates that represent a second time series can be determined with the trained neural network as described by Theiler et al., Physica D 58, p.77 (1982). A criterion d(r) for statistical dependency is calculated for the classification of the second time series, whereby r defines the plurality of steps into the future. The calculation of d(r) ensues both for the first time series as well as for the second time series. The difference between the criterion d(r) corresponding to the first time series and the criterion d(r) corresponding to the second time series explains the extent to which the second time series produced by the neural network agrees with the first time series. A number r of future steps are thereby considered in order to be able to make a more exact statement about the quality of the prediction or the quality of the coincidence.

An advantageous configuration of the inventive method lies in the employment of a time series having a Gaussian distribution instead of the first time series that describes the dynamic system. The Gaussian time series is obtained in that, corresponding to the plurality N of values of the first time series, random numbers are determined from a Gaussian distribution, i.e. around a mean with a variance to be determined. These N random numbers are sorted according to the rank of the first time series. A time series having a Gaussian distribution is thus obtained. Compared to the employment of the first time series, the employment of the modified time series having a Gaussian distribution has the advantage that the samples of the modified Gaussian time series are normalized as non-linearities, which could have been caused by the measuring apparatus in the registration of the samples, are correspondingly attenuated within the normed range by a Gaussian probability density distribution.

If the first time series has not been classified precisely enough, then it can be advantageous to implement an iteration with a non-linear Markov process of a higher order in order to obtain a more precise predictability of the second time series. Iterative tests with various hypotheses thus become possible.

DESCRIPTION OF THE PREFERRED EMBODIMENTS

Figure 1:
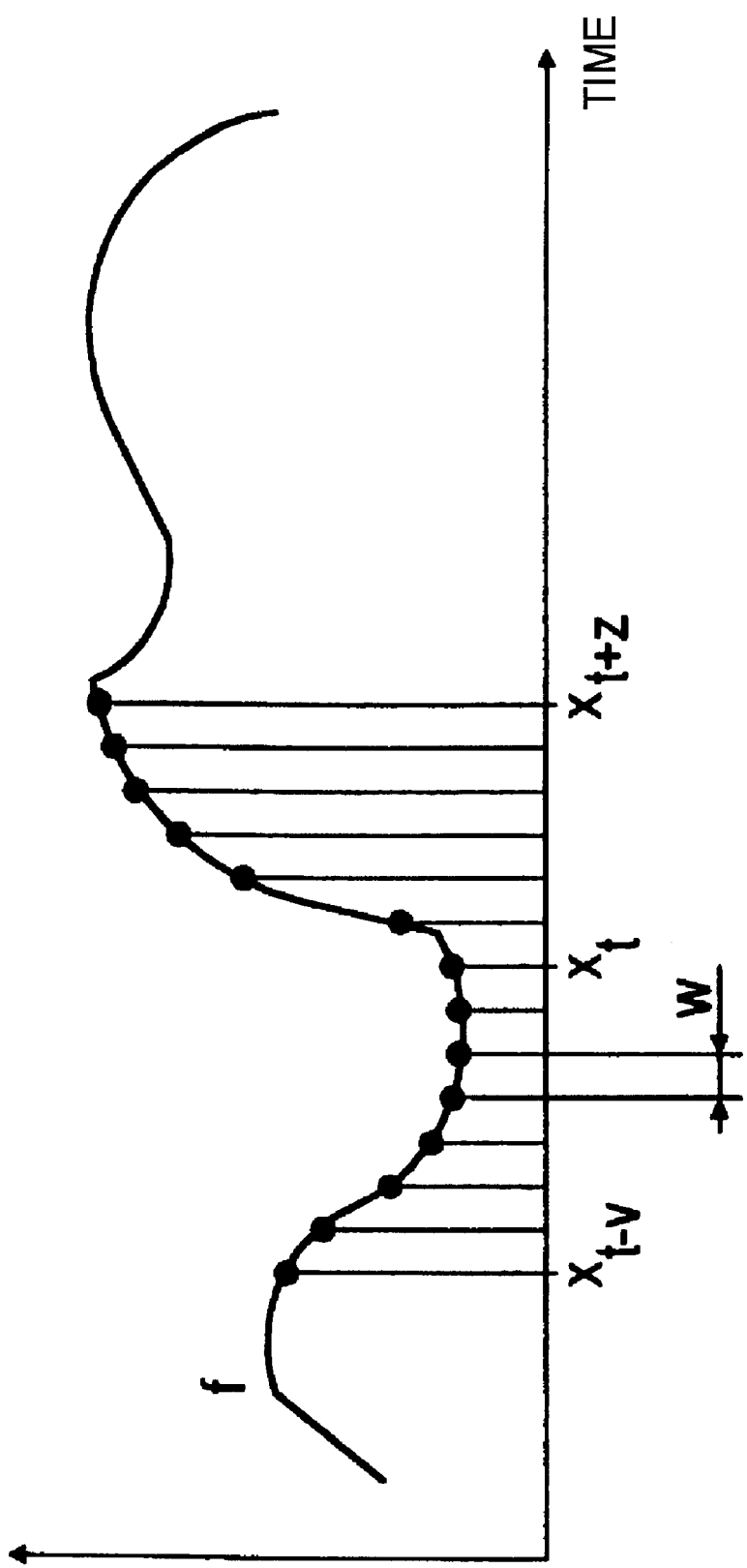
FIG. 1 illustrates the curve of a measured signal f that is converted into a time series {x} by sampling with a step width w.

FIG. 1 serves as introduction into the topic of the invention. The basic terms of the sampling of a measured time curve and corresponding designations are recited here. A measured signal f of an arbitrary dynamic system has an exemplary curve as shown. In order to be able to acquire the signal with a computer, it must be sampled and analog-to-digital converted. A arbitrary step width w defines the sampling interval. The sampled analog value must be converted into a digital value. The time series in a computer is thus composed of a number of samples that have been converted from analog form to digital form.

For the determination of future values according to a prediction probability, as is to be presented by the inventive method, the consideration of a point $x_t$ is critical, the point $x_{t-v}$ lying a specific number, designated herein as v, steps in the past therefrom and the point $x_{t+z}$ lying a specific designated herein as z, steps in the future therefrom.

Prediction means that, proceeding from the point $x_t$, a value for a point $x_{t+z}$ lying z steps in the future is to be predicted from the information of all points of the dynamic system lying in the past up to a point $x_{t-v}$.

Figure 2:
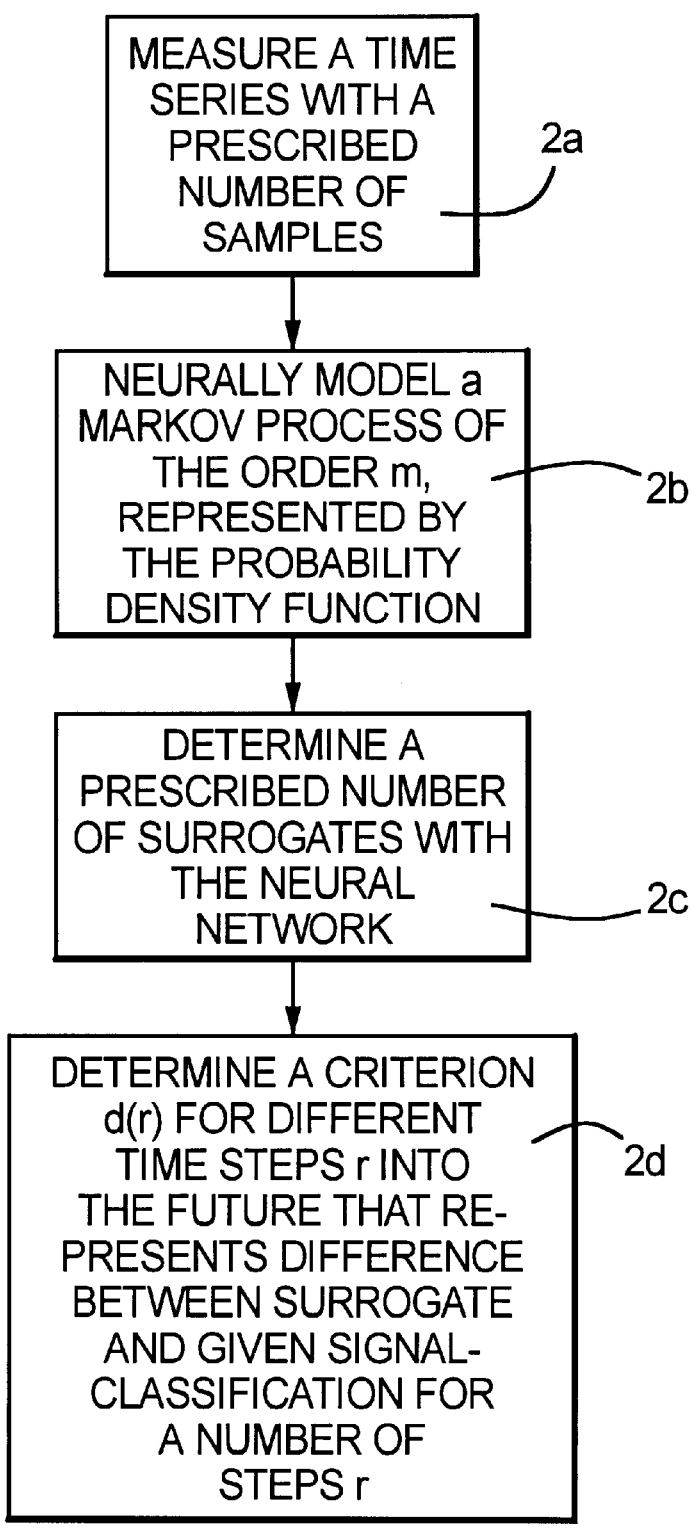
FIG. 2 is a flowchart showing the individual steps of the inventive method.

FIG. 2 shows the individual method steps of the inventive method.

The signal is measured in a first step 2a. When the dynamic system is of an analog nature, it must be sampled and made accessible to a computer R as first time series $\{x_t\}$ by analog-to-digital conversion. When the time series is already present in digital signals, the computer R can process these directly as first time series $\{x_t\}$.

In the next step 2b, the non-linear Markov process of the order m is neurally modelled. The order m of the non-linear Markov process should be determined such that it approximates the information flow of the first time series. If no detailed knowledge about the existing dynamic system is available, m=1 is set. An exception is when the dynamic system is determined by uncorrelated noise, which corresponds to m=0 and is discussed in the aforementioned Theiler et al. reference. In order to realize the non-linear Markov process of the order m, a neural network is trained in that the maximum likelihood principle is applied, this pursuing the training rule of maximizing the product of the probabilities. The neural network should thus implement an estimation of the conditioned probability $$p(x_t|x_{t-1}, \ldots, x_{t-m}) \text{ with } t=1, 2, \ldots, N \tag{1}.$$

A prescribable number of second time series $\{z_t\}$ (t=1, 2, ..., N) can be determined with the trained neural network. Each of these second time series corresponds to a surrogate $S_i$ (see FIG. 2, Step 2c). The m values from the past $x_1, \ldots, x_m$ are supplied as an input into the neural network. The neural network emits, as an output, a new value $z_1$, the first value of the second time series $\{z_t\}$. A new input $x_2 \ldots, x_m, z_1$ leads to a second value $z_2$ of the second time series. This second time series $\{z_t\}$ is obtained by iteration.

For a different number of future steps r (see FIG. 2, Step 2d), a respective difference between the first time series and the second time series that follows from the surrogate is calculated in that a criterion d(r) is respectively determined for the respective time series. The derivation of the criterion d(r) is presented in greater detail below.

Let the first time series $\{x_t\}$ be given.

A criterion for the predictability of a future value (r steps in the future) dependent on n-employed values from the past is established by $$p(x_1, \ldots, x_n, x_{n+r}) - p(x_1, \ldots, x_n) \cdot p(x_{n+r}) \tag{2},$$

whereby p(.) references the probability density function. The difference is 0 when $(x_1, \ldots, x_n)$ and $(x_{n+r})$ are statistically independent; otherwise, the difference is unequal to 0. When all types of correlations within at most r steps decrease to 0, one obtains $$p(x_1, \ldots, x_n, x_{n+r}) = p(x_1, \ldots, x_n) \cdot p(x_{n+r}) \tag{3}$$

(3) can also be rewritten as $$\ln \Phi_1 = \ln \Phi_2 + \ln \Phi_3 \tag{4}$$

$$\Phi_1 = \Phi_1(K_1, \ldots, K_n, K_{n+r}) = \int \exp\left(i \cdot \sum_{j=1}^{n,n+r} x_j K_j\right) \tag{5}$$

$$\cdot p(x_1, \ldots, x_n, x_{n+r}) dx_1 \ldots dx_n dx_{n+r}$$

$$\Phi_2 = \Phi_2(K_1, \ldots, K_n) = \int \exp\left(i \cdot \sum_{j=1}^{n} x_j K_j\right) \tag{6}$$

$$\cdot p(x_1, \ldots, x_n) dx_1 \ldots dx_n$$

$$\Phi_3 = \Phi_3(K_{n+r}) = \int \exp(i \cdot x_{n+r} \cdot K_{n+r}) \tag{7},$$

$$\cdot p(x_{n+r}) dx_{n+r}$$

whereby $\Phi(.)$ references the Fourier transform and $K_i$ references the variables of the function $\Phi(K_i)$ in the Fourier space.
$i=\sqrt{-1}$ thereby applies and $$\sum_{j=1}^{n,n+r}$$

expresses that the sum extends over all elements of $\{1, \ldots, n, n+r\}$.

When the characteristic functions are expanded into cumulatives [1], $$\Phi_1 = \exp\left(\sum_{j=1}^{\infty} \frac{i^j}{j!} \cdot \sum_{i_1, \ldots, i_j=1}^{n,n+r} \aleph_{i_1} \ldots {i_j} K_{i_1} \ldots K_{i_j}\right) \tag{8}$$

$$\Phi_2 = \exp\left(\sum_{j=1}^{\infty} \frac{i^j}{j!} \cdot \sum_{i_1, \ldots, i_j=1}^{n} \aleph_{i_1} \ldots {i_j} K_{i_1} \ldots K_{i_j}\right) \tag{9}$$

$$\Phi_3 = \exp\left(\sum_{j=1}^{\infty} \frac{i^j}{j!} \cdot \sum_{i_1, \ldots, i_j=n+r} \aleph_{i_1} \ldots {i_j} K_{i_1} \ldots K_{i_j}\right) \tag{10}$$

whereby $\aleph(.)$ reference the cumulatives (see [1]).

Insertion of this expansion into Equation (4) yields the condition $$\sum_{j=1}^{\infty} \frac{i^j}{j!} \cdot \sum_{\substack{i_1 \ldots i_j \\ B}}^{n,n+r} \aleph_{i_1} \ldots {i_j} K_{i_1} \ldots K_{i_j} = 0 \tag{11}$$

with the limitation $$B \equiv (\exists i_s : i_s = n+r \wedge \perp \notin i_s : i_s = n+r) \tag{12}.$$

In case of statistical independence, Equation (11) can be simplified to $$\aleph_{i_1} \ldots {i_j} = 0 \; \exists i_1, \ldots, i_j \in \{1, \ldots, n, n+r\} \wedge B \tag{13}.$$

As a result, a criterion is derived for the statistical dependence between the number n of employed values from the past and a point in time r-steps in the future on the basis $$d(r) = \sum_{j=1}^{\infty} \sum_{\substack{i_1, \ldots, i_j=1 \\ B}}^{n,n+r} \aleph_{i_1 \ldots i_j}^2 \tag{14}$$

In that d(r) is calculated for r=1, 2, ..., one obtains a cumulative-based characteristic of the information flow of the underlying dynamic system.

For practical application, Equation (14) should be approximated by a limited plurality of terms. Further, n must be finite. One approaches d(r) in that cumulatives up to the fourth order are calculated. Cumulatives of the first and second order take linear dependencies into consideration; cumulatives of the third and fourth order take non-linear dependencies into consideration.

The comparison of the first time series with a surrogate that represents the second time series enables a classification dependent on the criterion d(r), that is individually determined for every time series and for every time step r in the future.

The classification is based on a test that can be sequentially implemented for a plurality of 0-hypotheses, i.e. for ascending order of the non-linear Markov process. This iteration effects that the dynamic system can be described better by raising the order of the non-linear Markov process.

Figure 3:
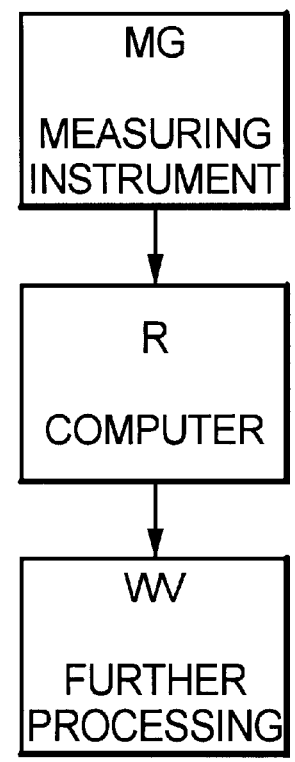
FIG. 3 is a block diagram of a computer for implementing the inventive method.

FIG. 3 shows the computer R with which the inventive method is implemented. The computer R processes the time series registered by the measuring instrument MG. The possibly analog signal can be analog-to-digitally converted both in the measuring instrument MG as well as in the computer R. Both possibilities are possible for the inventive method. The classification result that is determined by the computer R in the above-described way can be further-processed (WV) as needed.

Although modifications and changes may be suggested by those skilled in the art, it is the intention of the inventors to embody within the patent warranted hereon all changes and modifications as reasonably and properly come within the scope of their contribution to the art.

We claim:

1. Method for the classification of the statistical dependence of a measurable, first time series that comprises a prescribable plurality of samples, particularly of an electrical signal, with a computer, comprising the steps of:

1) neurally modelling a non-linear Markov process of the order m by training a neural network with data of the measurable, first time series to the prediction probabilities corresponding to the non-linear Markov process;

2) determining an arbitrary plurality of surrogates ($S_i$, i=1, 2, ..., M) that represent a second time series ($\{z_t\}$, t=1, 2, ..., N) in the neural network trained according to the non-linear Markov process;

3) calculating a respective criterion for statistical dependence d(r) for a plurality of r (r=1, 2, ...) for the first time series and the second time series, quantifying the statistical dependencies between the past of the respective time series and a value that lies r steps in the future for every individual surrogate ($S_i$) as a difference to the measurable, first time series, and classifying said measurable, first time series dependent on said criterion.

2. Method according to claim 1, comprising using a modified Gaussian time series ($\{y_t\}$, t=1, 2, ..., N) is utilized instead of the measurable, first time series ($\{x_t\}$, t=1, 2, ..., N), and forming said modified Gaussian time series by determining n random numbers from a Gaussian distribution and sorting said n random numbers according to the rank of the measurable, first time series.

3. Method according to claim 1 comprising selecting one of a plurality of iterative tests of different zero hypotheses iterating the selected one of said iterative tests with a non-linear Markov process of a respectively higher order in order to obtain a more exact predictability of the second time series.

4. Method according to claim 1 comprising defining the criterion for the statistical dependence d(r) by $$d(r) = \sum_{j=1}^{\infty} \sum_{\substack{i_1, \ldots, i_j=1 \\ B}}^{n, n+r} \aleph_{i_1 \ldots i_j}^2$$

wherein

B references a limitation for the index according to the rule $$B \equiv (\exists i_s : i_s = n+r \land \forall i_s : i_s = n+r)$$

i, j, s reference positive whole numbers, $\aleph$ reference the cumulatives, r references the plurality of steps into the future, and n references the plurality of employed values from the past.

* * * * *